(12) United States Patent
Jin et al.

(10) Patent No.: US 8,953,347 B2
(45) Date of Patent: Feb. 10, 2015

(54) CAPACITOR DISCHARGING CIRCUIT AND POWER CONVERTER

(75) Inventors: Hongyuan Jin, Shanghai (CN);
Baochen Wang, Shanghai (CN);
Hongjian Gan, Shanghai (CN);
Jianping Ying, Shanghai (CN)

(73) Assignee: Delta Electronics (Shanghai) Co., Ltd, Shanghai (CN)

( * ) Notice: Subject to any disclaimer, the term of this patent is extended or adjusted under 35 U.S.C. 154(b) by 396 days.

(21) Appl. No.: 13/482,750

(22) Filed: May 29, 2012

(65) Prior Publication Data

US 2013/0188405 A1 Jul. 25, 2013

(30) Foreign Application Priority Data

Jan. 20, 2012 (CN) .......................... 2012 1 0019923

(51) Int. Cl.
*H02M 1/00* (2006.01)
(52) U.S. Cl.
USPC .............................................. 363/78; 363/44

(58) Field of Classification Search
USPC ............ 363/44, 47, 48, 49, 74, 78, 81–82, 84, 363/89, 106, 108
See application file for complete search history.

(56) References Cited

U.S. PATENT DOCUMENTS

| 5,737,204 | A | * | 4/1998 | Brown | 363/89 |
| 8,593,837 | B2 | * | 11/2013 | Hong | 363/46 |
| 2003/0214825 | A1 | * | 11/2003 | Lee | 363/84 |
| 2011/0234176 | A1 | * | 9/2011 | Nakamura et al. | 320/166 |
| 2012/0134185 | A1 | * | 5/2012 | Shin et al. | 363/44 |

* cited by examiner

*Primary Examiner* — Adolf Berhane
*Assistant Examiner* — Henry Lee, III
(74) *Attorney, Agent, or Firm* — Tim Tingkang Xia, Esq.; Morris, Manning & Martin, LLP

(57) ABSTRACT

A capacitor discharging circuit and a power converter having the capacitor discharging circuit are disclosed. The capacitor discharging circuit comprises a conversion module connected with the two terminals of the capacitor, an AC power-off detecting unit used to detect on-off state of AC power, and a control unit. The conversion module comprises an energy consumption unit. When AC power is disconnected, the AC power-off signal generated by the AC power-off detecting unit intervenes the control unit to control the energy consumption unit to consume the energy stored in the capacitor.

17 Claims, 11 Drawing Sheets voltage of X-capacitor (a)

AC power-off signal (b)

driving signal of the switch element in the PFC conversion unit (c)

driving voltage of the switch element in the PFC conversion unit (d)

CAPACITOR DISCHARGING CIRCUIT AND POWER CONVERTER

CROSS REFERENCE TO RELATED APPLICATIONS

This application claims priority to the Chinese patent application No. 201210019923.2, filed Jan. 20, 2012, which is incorporated herein by reference in its entirety.

FIELD OF THE INVENTION

The present invention generally relates to a discharging device used in the field of power electronic technology, and more particularly to a capacitor discharging circuit and a power converter with the capacitor discharging circuit.

BACKGROUND OF THE INVENTION

Under normal circumstance, in order to meet the requirement of electromagnetic compatibility, a filter configuration comprising a capacitor is connected between AC power and the electronic devices. In compliance with the "safety of information technology equipment" standard, the capacitor is a safety capacitor which comprises X-capacitors and Y-capacitors. X-capacitor is connected between L line (Live line) and N line (Null line) of the input terminals of AC power.

Specifically positioned, X-capacitor will be charged upon the introduction of AC power, and will store energy in power plug when AC power is disconnected, which is likely to induce current leakage or make the enclosure charged to endanger user safety. Therefore, X-capacitor should be discharged rapidly in the event of AC power disconnection, and furthermore, the design of X-capacitor discharging circuit should meet related safety standard.

To comply with the "safety of information technology equipment" standard, one should ensure that the stored electric charge in a capacitor component of primary circuit is reduced to a minimal when designing electrical equipment at the external disconnection position of AC power. Specifically, if an electrical equipment is provided with a capacitor in the primary circuit, and if rated or nominal capacitance is more than 0.1 ii F and the discharge time constant of the capacitor is not more than the following specified values, the electrical equipment will be considered as qualified:

a) 1 second, for pluggable equipment of A type, and
b) 10 seconds, for equipment of permanent connection and pluggable equipment of B type;

Wherein, the discharge time constant refers to a calculation from equivalent capacitance (μF) and equivalent discharge resistance (MΩ). That is to say, after a time period which equals to the discharge time constant, the voltage of the capacitor component will reduce to 37% of its initial value.

In usual ways, discharging resistor is used to connect in parallel with X-capacitor and the time constant of the capacitor and resistor should be less than the specified value to meet the rules concerning capacitor discharge in "safety of information technology equipment". Next, the X-capacitor discharging technology in the prior art will be described using an example that an X-capacitor is comprised in a converter circuit.

FIG. 1 shows a circuit schematic diagram of a converter with an X-capacitor in the prior art, in which a discharging resistor is connected in parallel between the two terminals of the X-capacitor. As shown in the figure, an X-capacitor 2, a discharging resistor 3 and a converter module 1 are coupled successively, and the X-capacitor 2 is connected in parallel between the input terminals (between L line and N line) of AC power. The converter with the X-capacitor in the prior art is the same as other electrical equipment in which a discharging resistor is connected in parallel between the two terminals of the X-capacitor, i.e. high voltage energy is stored in the X-capacitor 2 for long time in the event of AC power disconnection, the discharging resistor 3 is used to provide discharging path for the X-capacitor 2 to meet the safety requirement.

However, the discharging resistor 3 will consume energy all along and induce power loss, especially, the power loss will become greater when the input voltage being higher, which is an important factor leading to the power loss of the converter during standby mode and no-load mode. With the increasing requirement of efficiency at the light-load mode, it is more and more important to minimize the power loss caused by the discharge of the X-capacitor 2.

Furthermore, the converter module 1 can be a two-stage converter composed of a power factor correction (PFC) conversion unit and a DC/DC conversion unit, and also can be a single-stage conversion module. If the converter module is the two-stage converter, the PFC conversion unit thereof can be a bridge PFC conversion unit or a bridgeless PFC conversion unit, and it can also be a boost PFC conversion unit, a buck PFC conversion unit or a boost-buck PFC conversion unit.

It should be stressed that the two-stage conversion module having a bridgeless PFC conversion unit has much higher efficiency in the case of heavy load due to the advantage of topology, compared to the conventional PFC conversion unit having a bridge structure, but the X-capacitor having greater capacitance needs to be used. If the discharging resistor is used to discharge the X-capacitor, the resistor having relative low resistance is preferred. The lower the resistance is, the greater the power loss of the discharging resistor is when AC power is introduced, which could lead to lower efficiency of the bridgeless PFC conversion unit in the light-load mode. Therefore, it becomes more and more urgent to solve the problem of the power loss induced by discharge of the X-capacitor.

Consequently, to meet the requirement of "safety of information technology equipment" and meanwhile to achieve high efficiency of electrical equipment especially in the light-load mode is becoming a pressing problem needs to be resolved.

SUMMARY OF THE INVENTION

In view of the severe power loss caused by a discharging resistor which the previous solution requires, the present application, in part, seeks to avoid the power consumption of discharging resistor when AC power is introduced, and proposes a solution to discharge X-capacitor through an energy consumption unit when AC power is off, without using the discharging resistor.

In one aspect, this application is stated by providing a capacitor discharging circuit, used to discharge a capacitor connected between live line and null line of AC power input terminal in a power converter. The power converter also comprises a conversion module coupled with the capacitor, the conversion module at least includes an energy consumption unit, and the capacitor discharging circuit also comprises an AC power-off detecting unit and a control unit. The AC power-off detecting unit is connected to the AC power input terminal and used to detect on-off state of AC power and generate an AC power-off signal. The control unit is connected to the output terminal of the AC power-off detecting unit, receiving the AC power-off signal outputted from the AC power-off detecting unit and controlling the operation of the energy consumption unit to consume the energy stored in the capacitor when disconnection of AC power is detected by the AC power-off detecting unit.

In another aspect, this application is stated by providing a power converter, comprising: a capacitor connected between live line and null line of AC power input terminal, a conversion module coupled with the capacitor, an AC power-off detecting unit and a control unit. The conversion module at least comprises an energy consumption unit. The AC power-off detecting unit is connected with the AC power input terminal and used to detect on-off state of AC power and generate an AC power-off signal. The control unit is connected to the output terminal of the AC power-off detecting unit, receiving the AC power-off signal outputted from the AC power-off detecting unit. The control unit affected by the AC power-off signal controls the operation of the energy consumption unit to consume the energy stored in the capacitor when disconnection of AC power is detected by the AC power-off detecting unit.

As can be seen from the technical resolution stated above, the characteristic of the capacitor discharging device provided by the present application is that the X-capacitor between live line and null line of AC power input terminal of the converter is discharged by an energy consumption unit, not by a discharging resistor. That is to say, when AC power is introduced normally, the AC power-off signal outputted from the AC power-off detecting unit is unable to affect the control unit; the control unit accomplishes the design function of the power converter on the basis of the original design method. With no discharging resistor connected between the two terminals of the X-capacitor, the power consumption of the discharging resistor is eliminated. When AC power is disconnected, the control unit affected by the AC power-off detecting unit controls the operation of the energy consumption unit to consume the energy stored in the capacitor. In this way, the present application enhances the efficiency of electrical equipment, which meets the requirement of "safety of information technology equipment".

In addition, the device in the original conversion unit can be used as the energy consumption unit, which reduces the power consumption of the discharging resistor and enhances efficiency in the light-load mode, and simplifies the circuit at the same time. Meanwhile, for the two-stage conversion module, high efficiency in the heavy-load mode can be achieved when a bridgeless PFC conversion unit being used. And low efficiency in the light-load mode is obtained when a discharging resistor being used if the X-capacitor is with large capacitance. The method of the present invention can effectively enhance the efficiency of the power converter including a bridgeless PFC conversion unit.

BRIEF DESCRIPTION OF THE DRAWINGS

The accompanying drawings are not intended to be drawn to scale. In the drawings, each identical or nearly identical component that is illustrated in various figures is represented by a like numeral. Fur purposes of clarity, not every component may be labeled in every drawing. In the drawings.

DETAILED DESCRIPTION

Some exemplary embodiments explaining the features and advantages of the present invention will be stated in detail in the following description. It is to be understood that different embodiments of the present invention have a variety of variations, which will fall within the scope of the present invention, and the description and figure showing are essentially used to explain the present invention, but not to limit the present invention.

The features and beneficial effects mentioned above, as well as other features and effects will be described in detail with embodiments of the X-capacitor discharging device of the present invention in conjunction with the attached FIG. 2-19.

Figure 2:
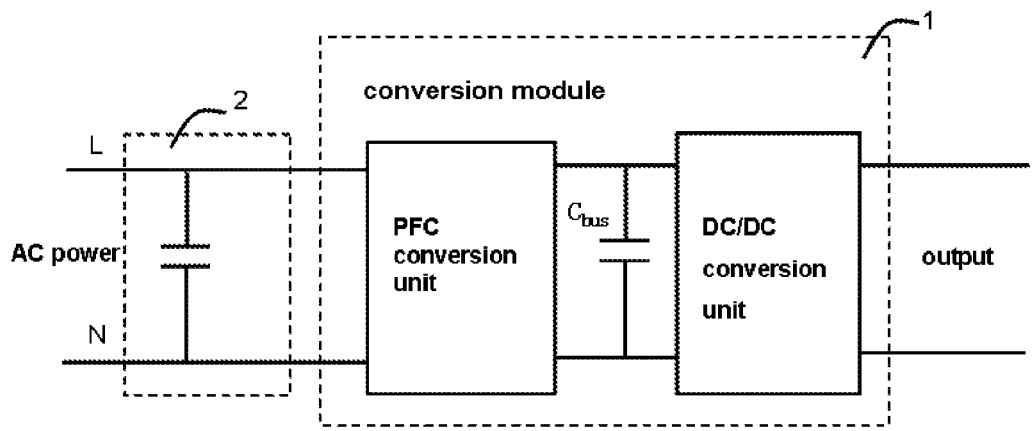
FIG. 2 is a circuit schematic diagram of a power converter applied in an embodiment of the present invention

As shown in FIG. 2, an AC-DC power converter (e.g. power adapter) or an AC-AC power converter, having AC power input terminals and output terminals, usually includes a capacitor 2 (usually called X-capacitor) connected between live line and null line of AC power input terminals, and a conversion module 1. The conversion module 1 can be a two-stage conversion module composed of a PFC conversion unit 11 and a DC power conversion unit 12, as shown in FIG. 2. Furthermore, the PFC conversion unit 11 can be a bridge PFC conversion unit or a bridgeless PFC conversion unit, and also can be a boost PFC conversion unit, a buck PFC conversion unit or a boost-buck PFC conversion unit. The DC power conversion unit 12 can be a DC/DC conversion unit or a DC/AC conversion unit. In other embodiments, the conversion module 1 can also be a single-stage conversion module, such as a single-stage flyback converter, which could have a function of power factor correction (PFC) or not.

The X-capacitor connected between the AC power input terminals (i.e. L line and N line) is charged when the power converter operates normally i.e. AC power is introduced. A voltage endangering user safety may be produced. For this reason, when AC power is disconnected, the power energy stored in the X-capacitor need to be released rapidly to ensure user safety. The capacitor need to be discharged in the power converter is the X-capacitor, and the X-capacitor could also be composed of multi capacitors connected in parallel or in series.

Next, the capacitor discharging circuit, in which the capacitor needs to be discharged is an X-capacitor, will be stated respectively by examples that the conversion module comprises a bridge PFC conversion unit and a DC/DC conversion unit, or the conversion module comprises a bridgeless PFC conversion unit, or the conversion module is a single-stage conversion module.

Figure 3:
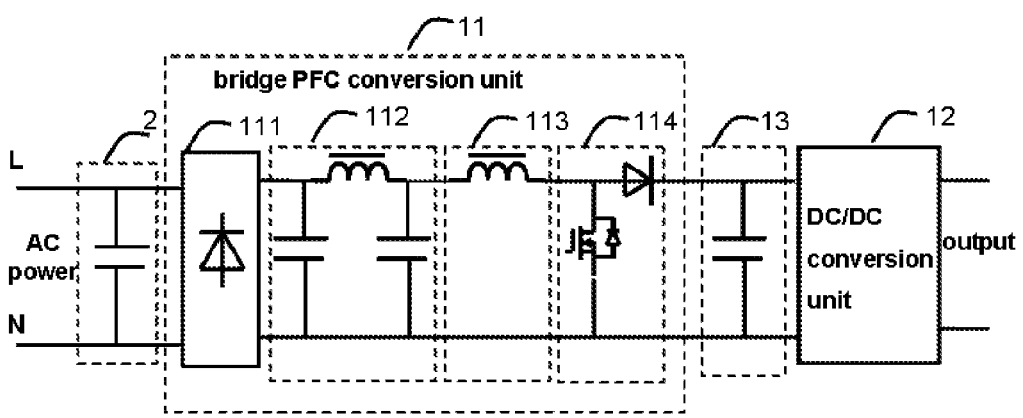
FIG. 3 is a circuit schematic diagram of an embodiment of the present invention in which the conversion module of the power converter comprises a bridge PFC conversion unit and a DC/DC conversion unit

Refer to FIG. 3; it is a circuit schematic diagram of an embodiment of the present invention, in which the conversion module of a power converter includes a bridge PFC conversion unit and a DC/DC conversion unit. As shown in the figure, the power converter having AC power input terminals (i.e. L line and N line) includes an X-capacitor 2, a bridge PFC conversion unit 11 with an input end and an output end, a DC/DC conversion unit 12 with an input end and an output end, and a bus capacitor 13, wherein the X-capacitor is coupled to the L line and N line, the X-capacitor are electrically coupled with the input end of the PFC conversion unit 11. The output end of the bridge PFC conversion unit 11 and the input end of the DC/DC conversion unit 12 are electrically coupled, between which the bus capacitor 13 is coupled. The bridge PFC conversion unit 11 comprises a bridge rectifier 111, a π filter unit 112, a PFC inductor 113 and a switching network 114 that are connected successively. Because the PFC inductor 113 in the bridge PFC conversion unit 11 is located in the downstream of the bridge rectifier 111, the π filter unit 112 can be added here. The filter unit 112 is not directly connected with the L line and N line, so the capacitor in the filter can be a non-safety capacitor, which doesn't need to be discharged when AC power is disconnected. However, the π filter unit 112 has the effect of differential filter, so the capacitance of the X-capacitor 2 can be reduced when the π filter unit being added. In other embodiments, the π filter unit 112 can also be omitted. For the power converter, the switch elements in the bridge PFC conversion unit 11 and the DC/DC conversion unit 12 operate in the state of original design when AC power is introduced, so as to achieve the function of power factor correction and DC power conversion.

Figure 4:
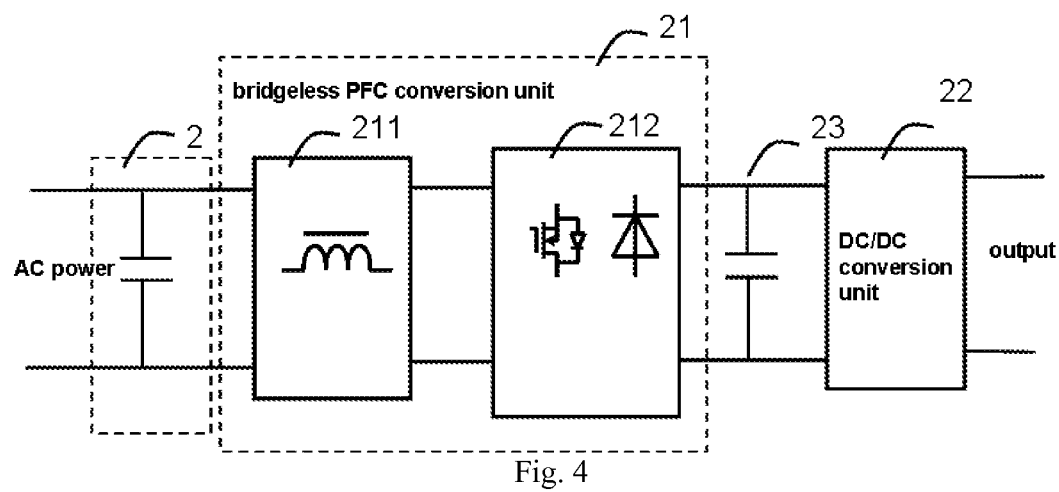
FIG. 4 is a circuit schematic diagram of an embodiment of the present invention in which the conversion module of the power converter includes a bridgeless PFC conversion unit

Refer to FIG. 4, it is a circuit schematic diagram of an embodiment of the present invention in which the conversion module of the power converter comprises a bridgeless PFC conversion unit and a DC/DC conversion unit. As shown in the figure, the power converter having AC power input terminals (i.e. L line and N line) includes an X-capacitor, a bridgeless PFC conversion unit 21 with an input end and an output end, a bus capacitor 23 and a DC/DC conversion unit 22 with an input end and an output end. The X-capacitor is connected between the L line and N line, and coupled with the bridgeless PFC conversion unit 21. The bus capacitor 23 is coupled with the bridgeless PFC conversion unit 21. The DC/DC conversion unit 22 is coupled with the bridgeless PFC conversion unit 21, and the output end of the DC/DC conversion unit 22 acts as the output end of the power converter. Wherein, the bridgeless PFC conversion unit 21 is composed of a PFC inductor 211 and a switch diode network 212.

Figure 5:
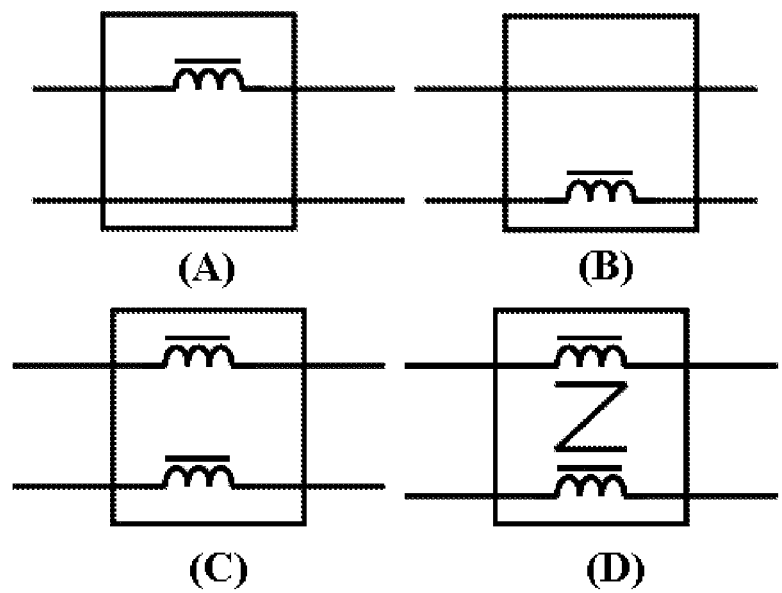
FIG. 5 is a structure diagrams of the PFC inductor unit used in the power converter according to the present invention

As stated above, both the bridge PFC conversion unit and the bridgeless PFC conversion unit comprises a PFC inductor unit, which could be any one of the PFC inductor unit shown in FIG. 5. Although only four types of the PFC inductor unit are shown in FIG. 5, the PFC inductor unit can be composed of one or multi inductors which are coupled to each other or not in other embodiments.

Figure 6:
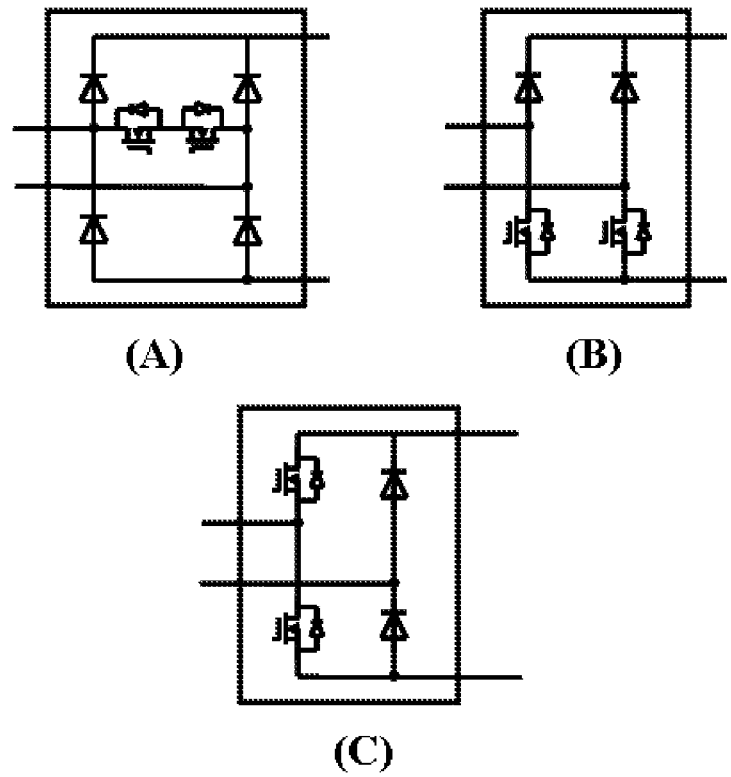
FIG. 6 is a structure diagrams of the switch diode network unit used in the power converter which includes a bridgeless PFC conversion unit according to the present invention

Refer to FIG. 6, it is structure diagrams of the switch diode network in the bridgeless PFC conversion unit of the embodiment shown in FIG. 4. Although only three types of the switch diode network are shown in the figure, other types of the switch diode network can also be employed, including derivative configurations in which diode and switch transistor are interchangeable.

The switch elements (i.e. switching transistors) of the switch diode network 212 in the bridgeless PFC conversion unit 21 work in switching state when the power converter operates normally, i.e. AC power is introduced, to realize the function of power factor correction.

Connected to AC power input end without via a bridge rectifier, the bridgeless PFC inductor cannot locate a differential mode π filter unit in the downstream of the bridge rectifier as the bridge PFC conversion unit does. So an X-capacitor with large capacitance is preferred to filter the differential mode signal. If a discharging resistor is used to discharge the X-capacitor, a discharging resistor with relative low resistance is preferred according to the rule of discharge time constant (RC<1 second), which leads to greater power loss when AC power is introduced. Therefore, the power converter provided with the bridgeless PFC conversion unit is faced with the problem of lower efficiency in the light-load mode.

Figure 7:
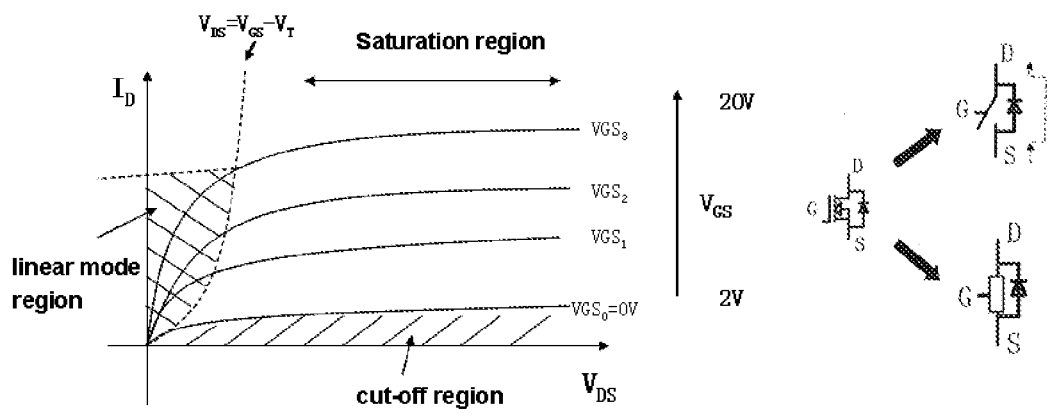
FIG. 7 is a schematic diagram showing the relation between the drain current ID and the drain-source voltage VDS of the switch element MOSFET

The conversion module at least includes a switch element, whether it is a single-stage conversion module or a two-stage conversion module, or whether the PFC conversion unit of the two-stage conversion module is a bridge PFC conversion unit or a bridgeless PFC conversion unit, or whether the DC power conversion unit of the two-stage conversion module is a DC/DC conversion unit or a DC/AC conversion unit. The switch element can operate in cut-off region, saturation region, or linear mode region. And it can be regarded as a variable resistor with large resistance when the switch element works in the saturation region, and it can be used as an energy consumption unit in the X-capacitor discharging circuit to discharge the X-capacitor and to restrict current of the discharge circuit. In some embodiments, the switch element could be an Insulated Gate Bipolar Transistor (called IGBT for short), or a Metal Oxide Semiconductor Field Effect Transistor (called MOSFET for short), etc. In this embodiment, the switch element is a Metal Oxide Semiconductor Field Effect Transistor (called MOSFET for short). Next, the principle of the energy consumption unit will be described by an example that the switch element is a MOSFET. Refer to FIG. 7, it shows the relation between the drain current ID and the drain-source voltage VDS of the switch element MOSFET. As shown in the figure, the dividing line between the liner (OHM) mode region and the saturation region is an ascending curved parabola (VDS=VGS−VT, VT is a threshold voltage). In the linear mode, the MOSFET is regarded as a resistor with small resistance (e.g. a few mΩ to several hundreds of mΩ) when turned on. That is to say:

The MOSFET works in linear mode region, when VGS>Vth and VDS<(VGS−Vth);

While in the saturation region, when the switch element MOSFET is turned on, it is like an rheostat and its equivalent resistance is controlled by the gate-source voltage. The switch element becomes a resistor with large resistance (e.g. up to a few kΩ to several hundreds or thousands of kΩ). That is to say:

The MOSFET works in saturation mode, when VGS>Vth, and VDS>(VGS−Vth)

Therefore, by the characteristic that the switch element is equivalent to a resistor with large resistance when it works in the saturation region, the X-capacitor can be discharged. And the switch element can switch from the linear mode region to the saturation region by decreasing its driving voltage. Next, the principle of the X-capacitor being discharged will be described by an example that the switch element in the conversion module is used as the energy consumption unit.

Figure 8:
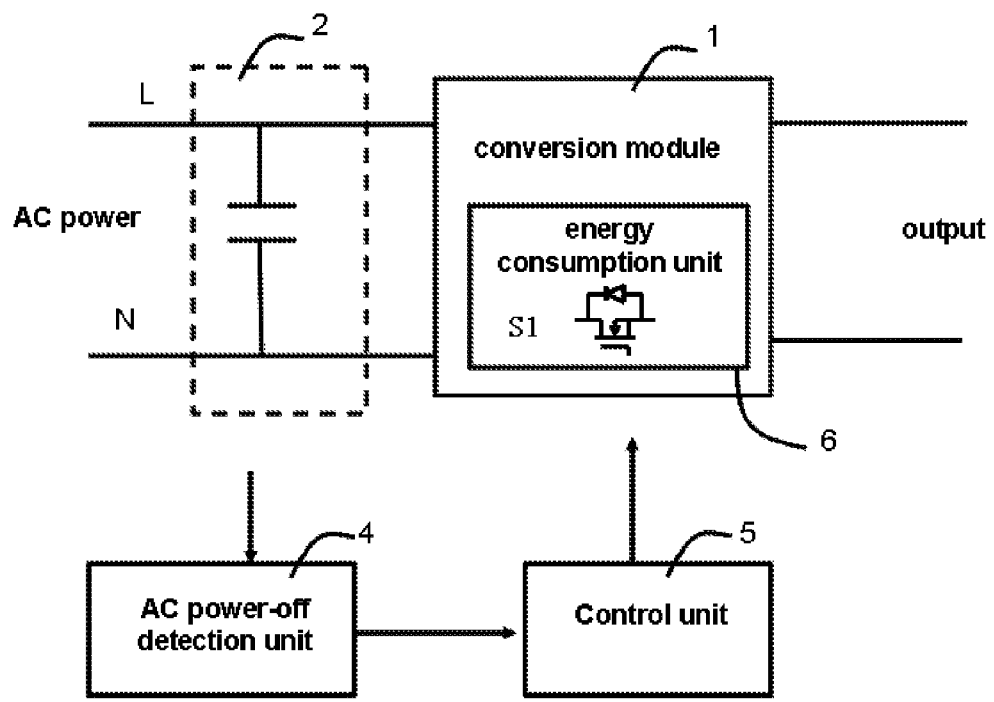
FIG. 8 is a schematic diagram of a power converter including a capacitor discharging device according to an embodiment of the present invention

Refer to FIG. 8, it is a schematic diagram of a power converter including the capacitor discharging device in an embodiment of the present invention. As shown in FIG. 8, the power converter having AC power input terminals (i.e. live line and null line) includes an X-capacitor 2, a conversion module 1, an AC power-off detecting unit 4 and a control unit 5. The capacitor 2 is connected between the live line and null line, and the conversion module 1 is connected with the capacitor in parallel. The conversion module 1 includes an energy consumption unit 6 which at least comprises a switch element. The AC power-off detecting unit 4, connected to the AC power input terminals, is used to detect the on-off state of AC power and output an AC power-off signal when AC power is disconnected. The control unit 5, connected to the output end of the AC power-off detecting unit 4, receives the AC power-off signal outputted from the AC power-off detecting unit 4. When disconnection of AC power is detected, the AC power-off signal affects the control unit 5, which controls the switch element (S1 in the figure) of the energy consumption unit 6 of the conversion module 1 to work in the saturation region. And the switch element can be regarded as a variable resistor, acting as the energy consumption unit, to consume energy stored in the X-capacitor 2. When AC power is introduced normally, the AC power-off signal won't affect the control unit 5, the switch element (S1 in the figure) of the conversion module 1 operates in switching state, and AC current exists in the X-capacitor 2 all the time because of AC power. In another embodiment, serving as the energy consumption unit 6, the switch element in the conversion module 1 is controlled to work in the saturation region to consume energy stored in X-capacitor 2. In other embodiment, the energy consumption unit 6 in the conversion module 1 can be any one of units that can consume the energy stored in X-capacitor 2 when AC power is disconnected. For example, the conversion module 1 comprises a switch element connected in parallel with the X-capacitor 2. In one embodiment, the switch element works in the cut-off region as original design when AC power is introduced properly, and it works in the saturation region when AC power is disconnected. That is to say, the switch element, which operates in the saturation region after the disconnection of AC power, is used as the energy consumption unit 6 to consume the energy stored in the X-capacitor 2.

Figure 1:
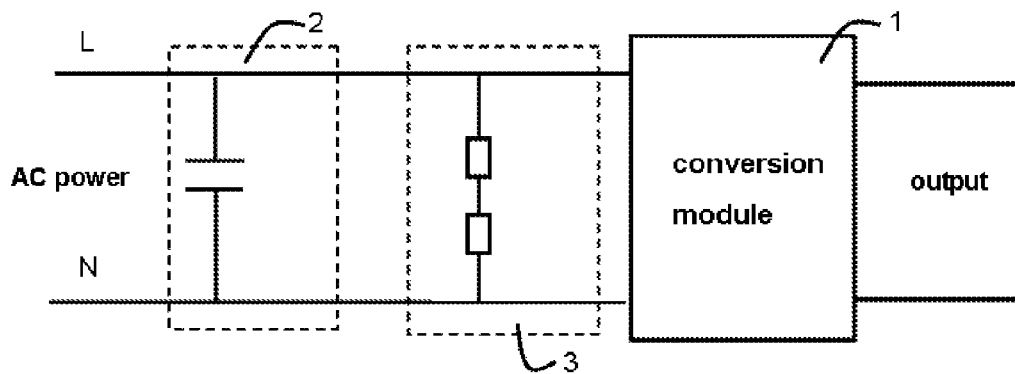
FIG. 1 is a circuit schematic diagram of a converter having an X-capacitor and having a discharging resistor connected in parallel with the capacitor in the prior art

In an embodiment of the present invention, the energy consumption unit 6 is a part of the conversion unit 1. Specifically, it is the switch element in the conversion module 1, which can be one of the essential elements to perform power conversion when AC power is introduced. When AC power is introduced, the voltage of the AC power-off signal outputted from the AC power-off detecting unit 4 is less than a given threshold voltage (for example 1.2V) all the time, the AC power-off signal is unable to affect the control unit 5, so the control unit 5 controls the conversion module 1 to perform power conversion as original design. When AC power is disconnected, the AC power-off signal outputted from the AC power-off detecting unit 4 is greater than the given threshold voltage, the control unit 5 affected by the AC power-off signal controls the switch element of the energy consumption unit 6 in the conversion module 1 to work in the saturation region. For the reason that the switch element is equivalent to a resistor with large resistance, the X-capacitor 2 can be discharged. Meanwhile, too large discharging current can be prevented when the switch element works in the linear mode region. In an embodiment of the present invention, when AC power disconnection is detected by the AC power-off detecting unit, the AC power-off signal affects the control unit to output an enable signal turning on the switch element and decrease the driving voltage of the switch element, so as to control the switch element of the energy consumption unit to work in the saturation region to consume the energy stored in the X-capacitor 2. That is to say, only at the time when AC power is disconnected, the control unit 5 is affected by the AC power-off signal outputted from the AC power-off detecting unit 4, such that the control unit 5 controls the switch element of the energy consumption unit 6 in the conversion module 1 to work in the saturation region to consume the energy stored in the capacitor 2. In this embodiment, the switch element in the conversion module 1 is used as the energy consumption unit 6 only at the time when AC power is disconnected, to discharge the X-capacitor 2 which needs to be discharged, without using a discharge resistor, which is different than the case shown in FIG. 1. Hence, the power consumption caused by the discharging resistor is reduced. Meanwhile, the energy consumption unit 6 in the capacitor discharging circuit of the present invention can be a part of the power converter, without additional energy consumption unit.

In an embodiment of the present invention, the AC power-off detecting unit 4 can judge whether AC power is disconnected or not by detecting the voltage of X-capacitor 2, but it is not limited to this. It should be noted that in the embodiments of the present invention the AC power-off detecting unit 4 can work in any one of the modes capable of judging on-off state of AC power.

Figure 9:
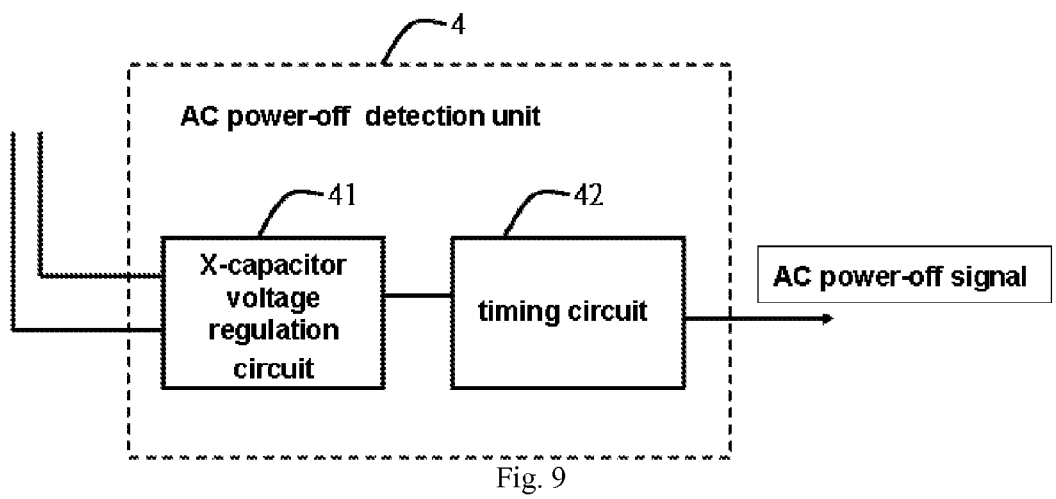
FIG. 9 is a schematic diagram of the AC power-off detecting unit according to an embodiment of the present invention

Refer to FIG. 9, it is a diagram of the AC power-off detecting unit in an embodiment of the present invention. In this embodiment, the AC power-off detecting unit 4 comprises an X-capacitor voltage regulation circuit 41 and a timing circuit 42. The X-capacitor voltage regulation circuit 41 is used to convert the AC voltage of the X-capacitor 2 to match the following timing circuit 42, that is to say, the voltage signal across the X-capacitor 2 is converted to another output voltage signal, which can reflect the AC characteristic of AC power. The AC characteristic of the output voltage signal is judged by the timing circuit 42, that is to say, the time of positive voltage and that of negative voltage of the X-capacitor 2 is calculated respectively. If the time of positive voltage or that of negative voltage is not more than a predetermined time (e.g. the predetermined time is the period of AC power), then it is judged that AC power is properly introduced; if the time of positive voltage or that of negative voltage exceeds the predetermined time, it is judged that AC power is off. As to the form of the circuit, the signal indicating on-off state of AC power is generated by judging whether the DC voltage signal outputted from the timing circuit 42 exceeds a given second voltage threshold Vth2 or not, and then it is outputted. Specifically, whether the DC voltage signal exceeds the given second voltage threshold value Vth2 or not is judged by the capacitor charge and discharge voltage of RC (resistor capacitor) circuit. If the capacitor charge and discharge voltage exceeds the given second threshold voltage Vth2, then the AC power-off detecting unit 4 will generate the AC power-off signal, and the switch element in the conversion module 1 will be used as the energy consumption unit 6 to consume the energy stored in the X-capacitor 2. Or else, it is judged that AC power is still on.

In some other embodiments, the AC power-off detecting unit 4 can also be embodied as a digital circuit, with the similar principle as that of analog circuits. It won't go into the details here. Next, the working principle of the AC power-off detecting unit 4 will be stated in detail by one embodiment.

Figure 10:
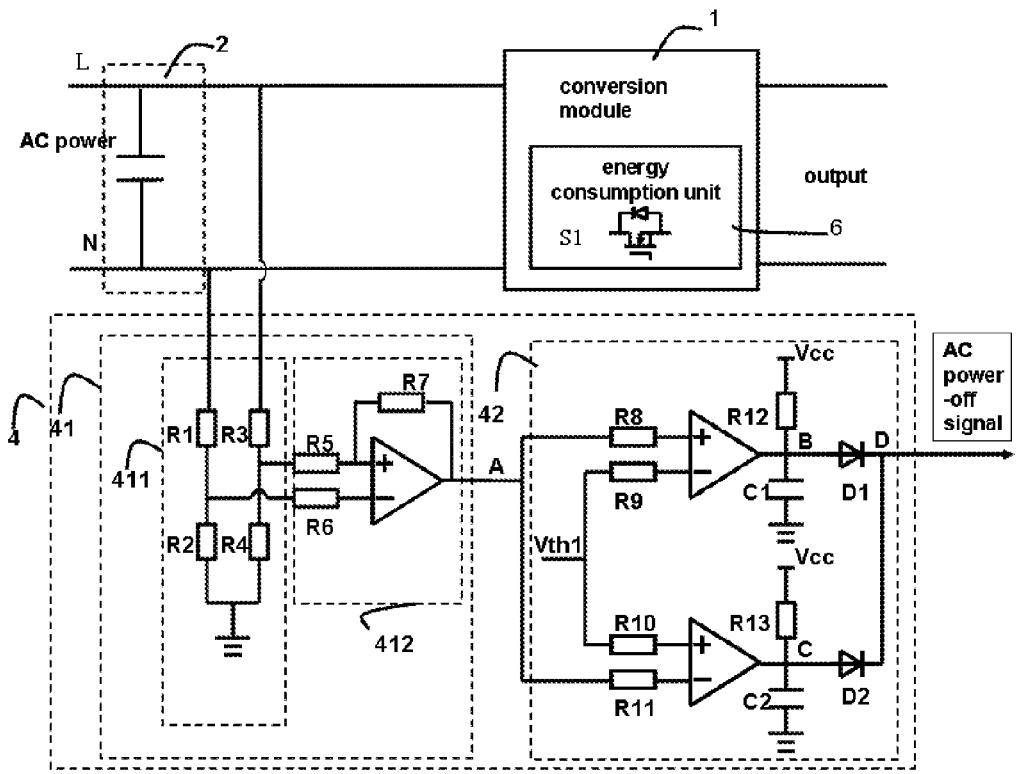
FIG. 10 shows a circuit schematic diagram of the AC power-off detecting unit according to an embodiment of the present invention

Refer to FIG. 10, which shows a circuit schematic diagram of the AC power-off detecting unit according to the present invention. As shown in the figure, the AC power-off detecting unit 4 includes an X-capacitor voltage regulation circuit 41 and a timing circuit 42, the X-capacitor voltage regulation circuit 41 comprises a voltage divider network 411 and a comparator 412, and the timing circuit 42 is a timing integration circuit. First, the sampled X-capacitor voltage is regulated by the comparator 412 of the X-capacitor voltage regulation circuit 41, then the timing circuit 42 carries out the process of comparison timing integration for the signal outputted from the X-capacitor voltage regulation circuit 41 to get the output signal of the AC power-off detecting unit 4, i.e. the AC power-off signal. If the voltage signal of the X-capacitor is alternating, then the capacitor in the timing circuit 42 will be charged or discharged periodically, leading to that the outputted AC power-off signal is lower than the given voltage value; otherwise, if the X-capacitor voltage signal is constant, the output of the timing circuit 42 will be higher than the given voltage value. Therefore, when AC power is introduced, the output voltage of the AC power-off detecting unit 4 is lower than the given second threshold voltage Vth2, and when AC power is off, the output voltage of the AC power-off detecting unit 4 is higher than Vth2, so it is judged that AC power is off, and the AC power-off signal will affect the control unit 5, which will control the switch element of the energy consumption unit 6 in the conversion module 1 to work in the saturation region, so as to consume the energy stored in the X-capacitor 2. As shown in FIG. 10, the voltage divider network 411 of the X-capacitor voltage regulation circuit 41, used to sample the voltage of the X-capacitor 2, includes a first resistor R1, a second resistor R2, a third resistor R3 and a fourth resistor R4, wherein the resistor R1 and the resistor R2 are connected in series to form a first branch, the resistor R3 and the resistor R4 are connected in series to form a second branch. One end of the first branch is connected to the N line of AC power, one end of the second branch is connected to the L line of AC power, the other end of the first branch and that of second branch are both grounded. The comparator 412 of the X-capacitor voltage regulation circuit 41 includes a first comparator, which comprises a positive input end, a negative input end and an output end. The common node of the first resistor R1 and the second resistor R2 is connected to the negative input end of the first comparator via a resistor, the common node of the third resistor R3 and the fourth resistor R4 is connected to the positive input end of the first comparator via a resistor. The output end of the comparator (i.e. point A) is the output end of the X-capacitor voltage regulation circuit 41. The timing circuit 42 includes a second comparator, a third comparator, a first charging delay circuit, a second charging delay circuit, a first diode D1 and a second diode D2. The output end of the X-capacitor voltage regulation circuit 41 (i.e. point A) is connected to the positive input end of the second comparator and the negative input end of the third comparator via a resistor respectively. A first threshold voltage Vth1 is respectively added to the negative input end of the second comparator and the positive input end of the third comparator via a resistor. The first charging delay circuit comprises a first capacitor C1 and a twelfth resistor R12 that are connected is series, one end of them is connected to DC voltage source Vcc, the other end of them is grounded. The common node of the capacitor C1 and the resistor R12 is connected to the output end of the second comparator (i.e. point B). The second charging delay circuit comprises a second capacitor C2 and a thirteenth resistor R13 that are connected is series, one end of them is connected to DC voltage source Vcc, the other end of them is grounded. The common node of the capacitor C2 and the resistor R13 is connected to the output end of the third comparator (i.e. point C). Anodes of the first diode D1 and the second diode D2 are connected to the output end of the second comparator (i.e. point B) and the output end of the third comparator (i.e. point C) respectively. Cathodes of diode D1 and diode D2 are connected directly to act as the output end of the timing circuit, i.e. the output end of the AC power-off detecting unit 4 that outputs an AC power-off signal.

Figure 11:
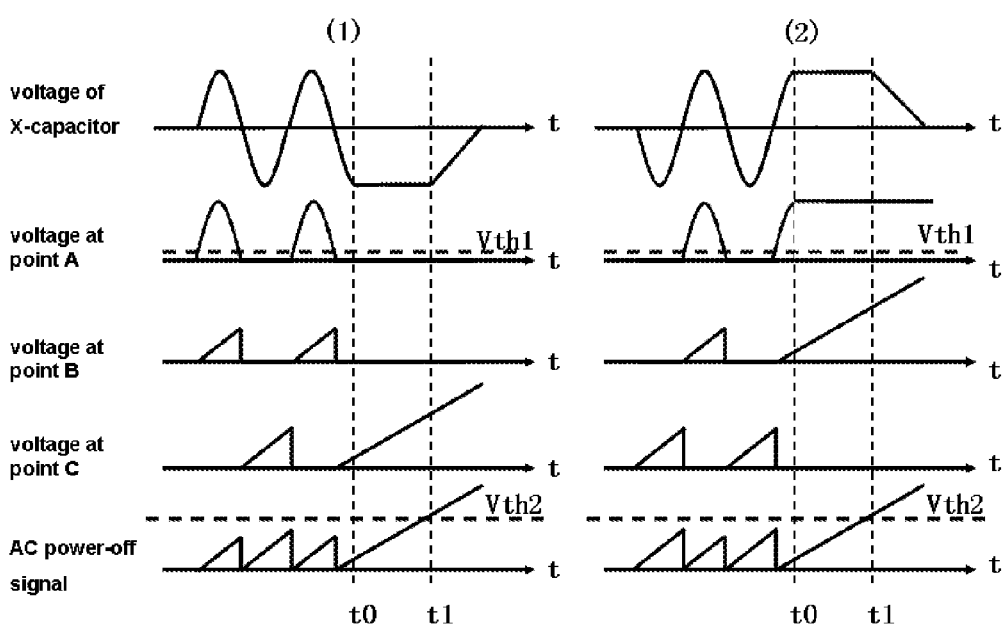
FIG. 11 shows waveforms of the AC power-off detecting unit showing in FIG. 10

Refer to FIG. 11, it shows waveforms of the embodiment of the AC power-off detecting unit in FIG. 10. FIGS. 11.(1) and 11.(2) illustrate the cases that AC power is off during its negative period and its positive period respectively.

Now, refer to FIG. 11.(1), details will be stated by an example that AC power is disconnected when its voltage being negative. Before time t0, AC power is introduced normally, the voltage of the X-capacitor is a sinusoidal wave, divided by the first resistor R1 and the second resistor R2 that are connected is series, and also divided by the third resistor R3 and the fourth resistor R4 that are connected is series, as well as passing by the first comparator, the voltage at point A has a waveform of a half wave rectified sine with positive period only. That waveform can reflect the AC alteration of the X-capacitor 2. And it is compared with the first threshold voltage Vth1 by the second and third comparator respectively, such that the first capacitor and the second capacitor of the first charging delay circuit and the second charging delay circuit is periodically charged and discharged by DC voltage source Vcc. For instance, when X-capacitor voltage is positive and voltage of point A is higher than the given threshold voltage Vth1, the first capacitor C1 is charged and the second capacitor C2 is discharged. But because of the periodic AC alteration of the X-capacitor's voltage, the voltage value of the first capacitor C1 or that of the second capacitor C2 won't exceed the second threshold voltage Vth2 to affect the control unit 5 when the capacitor C1 or capacitor C2 is being charged. Afterwards, the energy stored in the first capacitor C1 or the second capacitor C2 is released rapidly, so the conversion module works as the original design. At the time t0, AC power is disconnected, the voltage of X-capacitor 2 remains constant, the voltage of point A remains at low level, the capacitor C2 is continuously charged, the capacitor C1 is discharged to zero i.e. the voltage of point B is zero, the output voltage signal of the AC power-off detecting unit 4 is the voltage signal at point C. At the time t1, the voltage of capacitor C2 exceeds the given second threshold voltage Vth2, that is to say, the output voltage of the AC power-off detecting unit 4 is higher than the given voltage value, thereby the disconnection of AC power is detected. At this time, the AC power-off signal outputted from the AC power-off detecting unit 4 affects the control unit 5, such that the control unit 5 controls the switch element of the energy consumption unit 6 in the conversion module 1 to work in the saturation region to consume the energy stored in the X-capacitor 2.

In the embodiment of the present invention, the first threshold voltage Vth1, the second threshold voltage Vth2 and the DC voltage source Vcc can be determined on the basis of design requirements, and the above voltage values can be derived from internal circuit of the power converter or other circuit.

FIG. 11.(2) shows voltage waveforms of the X-capacitor, point A, point B and point C, as well as waveform of the AC power-off signal when AC power is off during its positive period. The operation principle is the same as that in FIG. 11.(1) and wouldn't be described here.

In the embodiment of the present invention, whether the capacitor voltage of the RC circuit in the timing circuit exceeds the given second threshold voltage Vth2 or not is judged. If the capacitor voltage exceeds the given second threshold voltage Vth2, it is judged that AC power is off, or else, it is judged that AC power is still on. In some other embodiments, it can be detected by other circuits that whether AC power is off or not. In this embodiment, the function of the AC power-off detecting unit 4 is achieved by analog circuit, but in some other embodiments, it could be realized by digital circuit.

Next, the working principle of the control unit 5 will be briefly described by an example that the energy consumption unit is a switch element.

Figure 12:
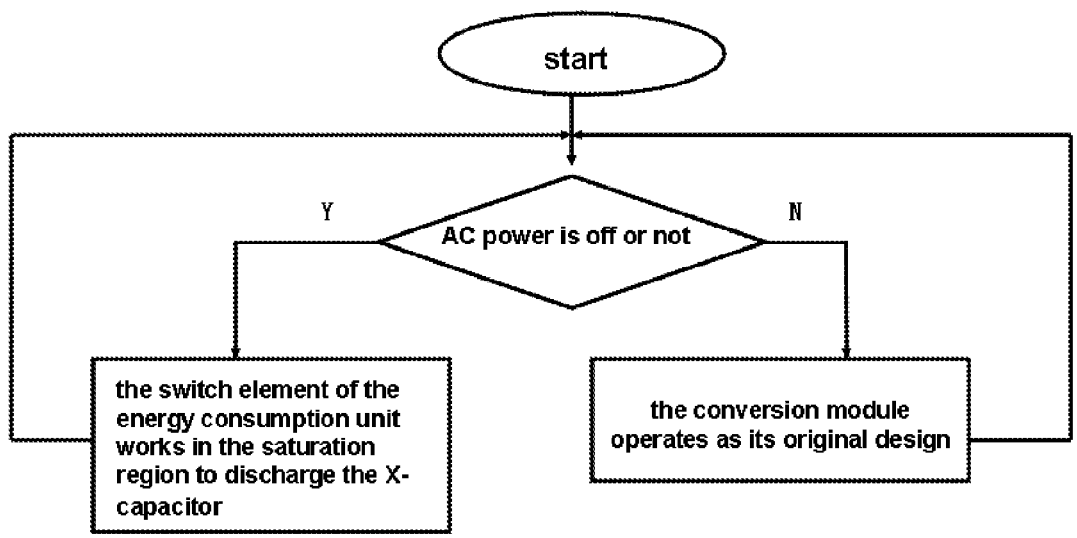
FIG. 12 is a flow diagram of the working principle of the X-capacitor discharging device in an embodiment of the present invention

Refer to FIG. 12, it is a flow diagram of the working principle showing that the X-capacitor is discharged in the embodiment of the present invention. As shown in the figure, if AC power is disconnected, the AC power-off detecting unit affects the control unit to make the switch signal being high level all the time. And the driving voltage is decreased, such that the switch element of the energy consumption unit in the conversion module works in the saturation region all the time, consuming the energy stored in the X-capacitor. Hence, the X-capacitor is discharged. If AC power is introduced normally, the switch element in the converter operates as the original design, i.e. the switch element in the converter works in switching state or in cut-off state, to accomplish the function of original design.

Figure 13:
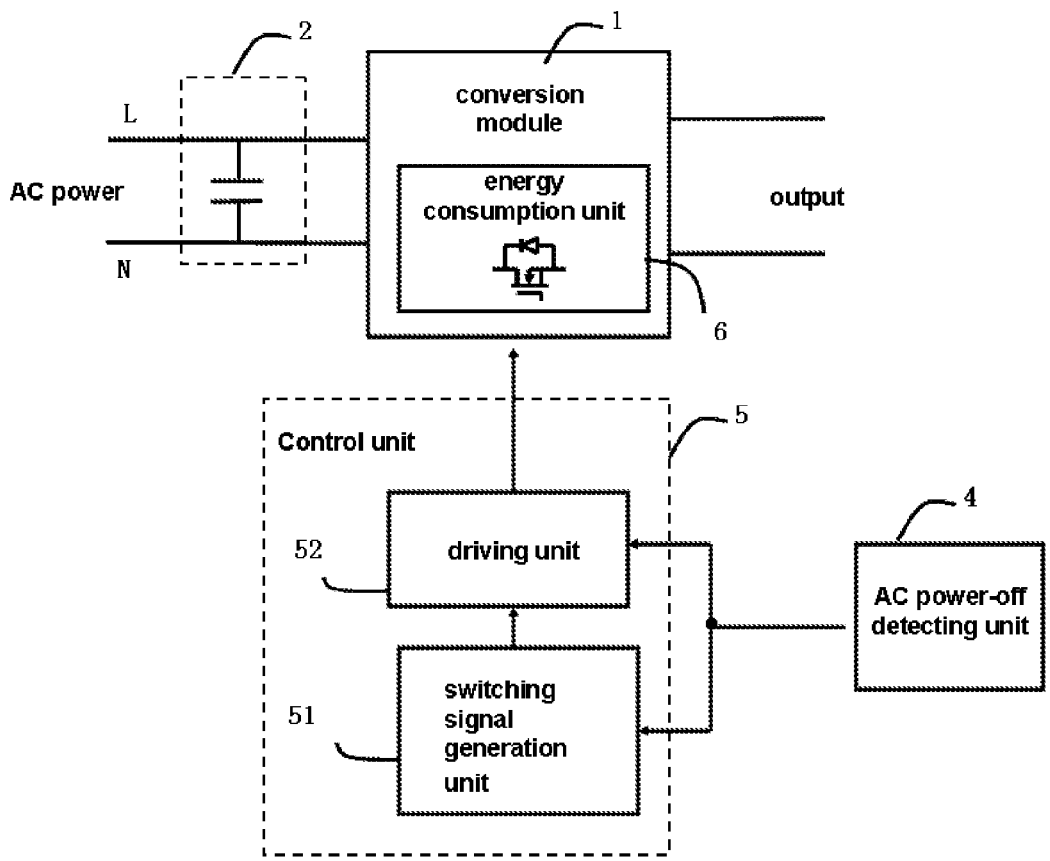
FIG. 13 is a schematic diagram of an embodiment of the present invention in which the control unit is affected by the AC power-off signal

Refer to FIG. 13, it is a schematic diagram of the controlling principle showing that the control unit is affected by the AC power-off signal. The control unit 5 comprises a switching signal generation unit 51 and a driving unit 52. When AC power is disconnected, the AC power-off signal affects the control unit 5, such that the switching signal generation unit 51 outputs a continuous enable signal to turn on the switch element and the driving unit 52 reduces the driving voltage. Thus, the switch element in the energy consumption unit 6 of the conversion module 1 works in the saturation region. The driving unit 52 and switching signal generation unit 51 in the control unit of original power converter can be used as the driving unit 52 and the switching signal generation unit 51 respectively.

Figure 14:
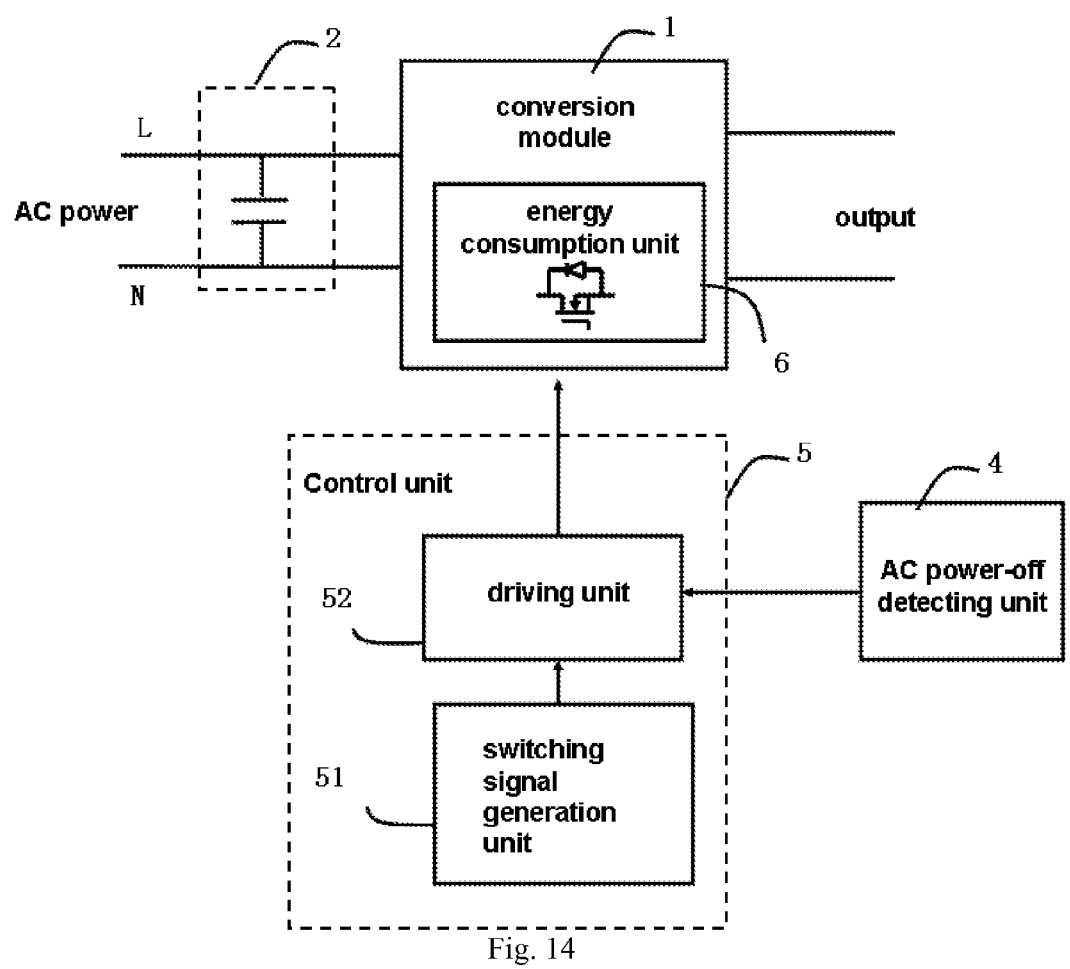
FIG. 14 is a schematic diagram of an embodiment of the present invention in which the control unit is affected by the AC power-off signal

Refer to FIG. 14, it is a schematic diagram of the controlling principle showing that the control unit is affected by the AC power-off signal. The control unit 5 comprises the switching signal generation unit 51 and the driving unit 52. When AC power is disconnected, different from that in FIG. 13, the AC power-off signal affects the driving unit 52 only, such that the driving unit 52 is forced to output a high level signal no matter whether the switching signal generation unit 51 outputs a high level signal or a low level signal. And the driving voltage is also decreased which controls the switch element in the energy consumption unit 6 of the conversion module 1 to work in the saturation region. The switching signal generation unit 51 in the control unit 5 of original power converter can act as the switching signal generation unit 51.

Figure 15:
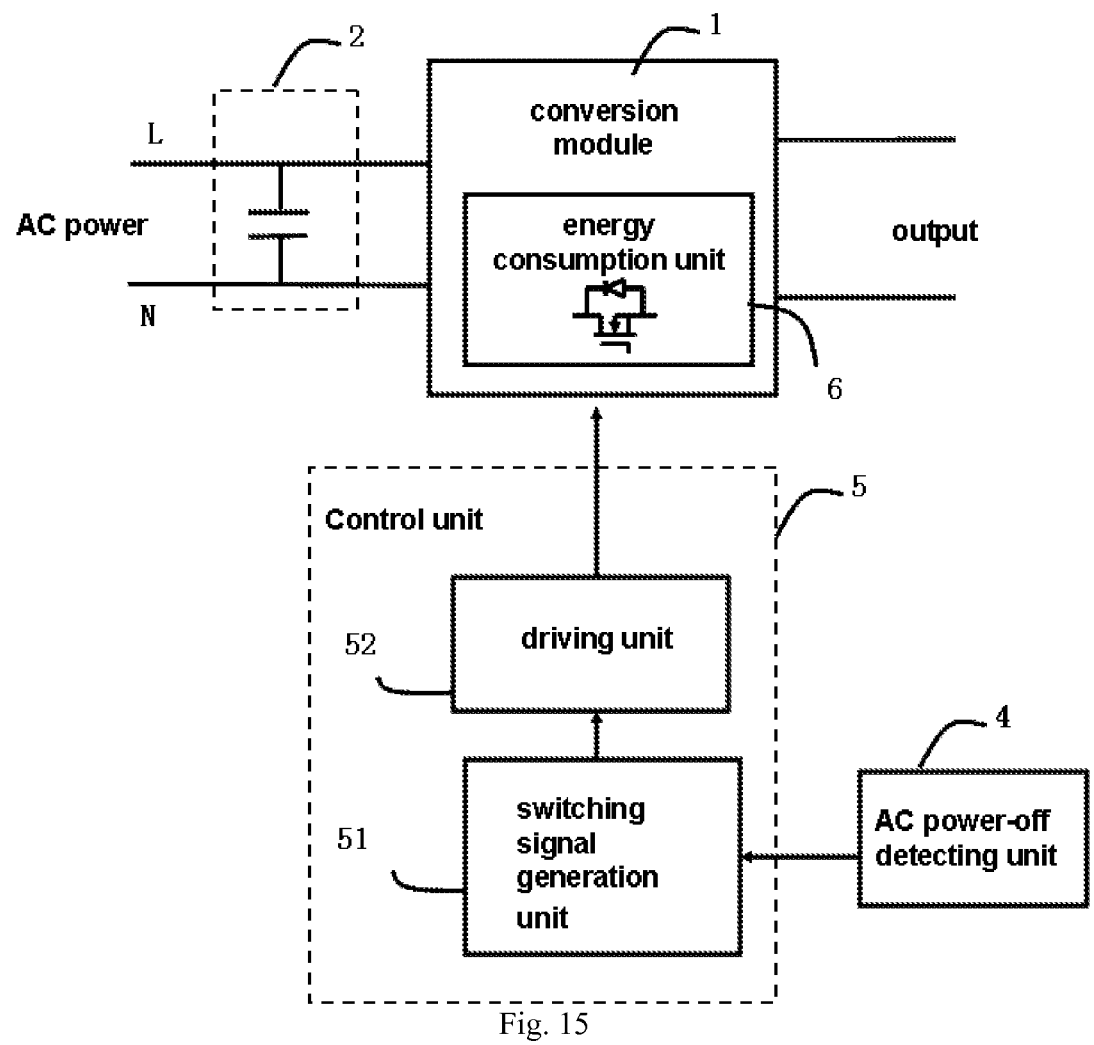
FIG. 15 is a schematic diagram of an embodiment of the present invention in which the control unit is affected by the AC power-off signal

Refer to FIG. 15, it is a schematic diagram of controlling principle showing that the control unit is affected by the AC power-off signal. The control unit 5 comprises the switching signal generation unit 51 and the driving unit 52. When AC power is disconnected, different from that in FIG. 13, the AC power-off signal affects the switching signal generation unit 51 only, such that the switching signal generation unit 51 outputs a continuous enable signal to turn on the switch element. When the driving unit 52 receives a high level signal which lasts a given period of time (e.g. the period of time is greater than the predetermined maximum switching cycle), the switching signal generation unit is controlled by the AC power-off signal at the time, and the driving voltage is reduced by the driving unit 52. Thus, the switch element in the energy consumption unit 6 of the conversion module 1 works in the saturation region.

Figure 16:
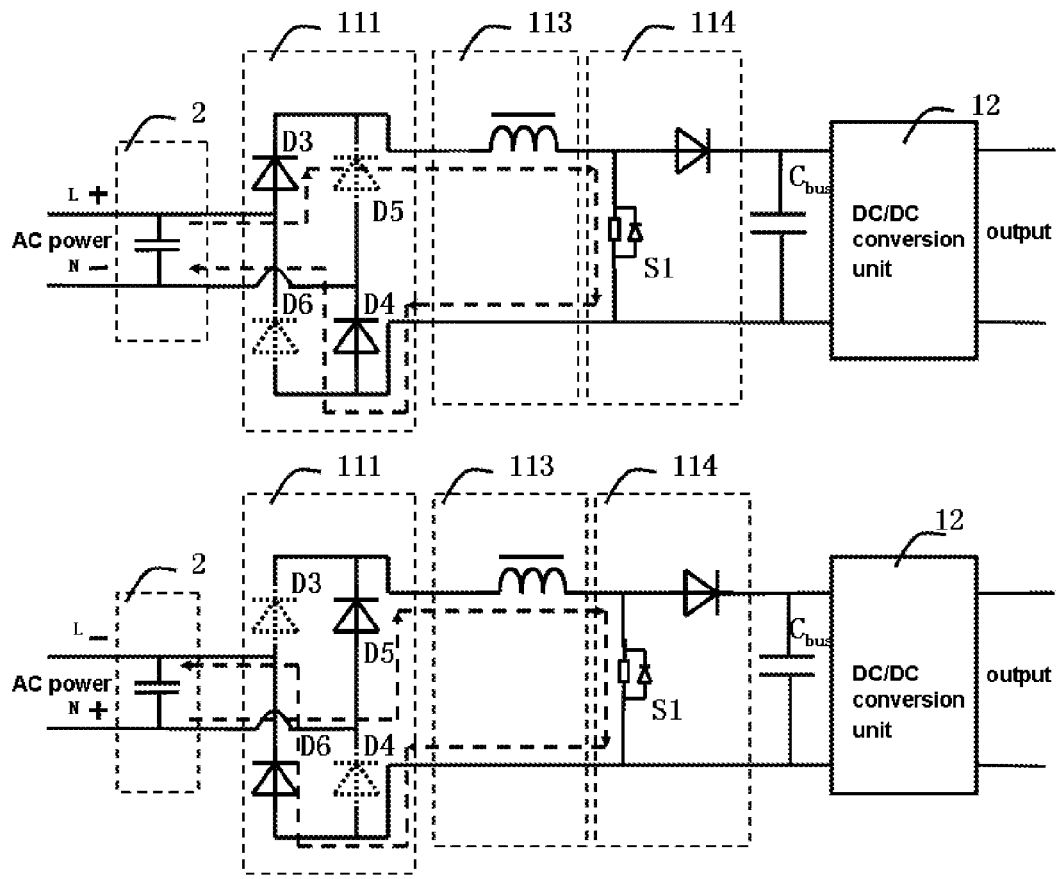
FIG. 16 shows the discharge circuit of the X-capacitor in the power converter of FIG. 3

Refer to FIG. 16, it is a schematic diagram of the X-capacitor discharge circuit in the power converter of FIG. 3. In this embodiment, the conversion module is composed of two units: a PFC conversion unit 11 and a DC/DC conversion unit 12. The PFC conversion unit 11 is a bridge PFC conversion unit and the π filter unit is absent here. When the disconnection of AC power is detected by the AC power-off detecting unit, the AC power-off signal outputted from the AC power-off detecting unit affects the control unit to control the switch element S1 of the bridge PFC conversion unit to work in the saturation region, such that the switch element is equivalent to a resistor with large resistance, acting as the energy consumption unit. The energy consumption unit can discharge the X-capacitor and restrict the discharge current effectively. FIG. 16 (A) is a schematic diagram of the discharge circuit of X-capacitor 2 in the case that the voltage of L line is positive at the time of AC power disconnection. The energy stored in the X-capacitor 2 passes through the third diode D3 of the bridge rectifier 111, the PFC inductor 113, the switch element S1 in the switch network 114 and the fourth diode D4 of the bridge rectifier 111, and flows back to the X-capacitor 2 to form a loop to discharge the X-capacitor 2. FIG. 16 (B) is a discharge circuit of the X-capacitor 2 in the case that the voltage of N line is positive at the time of AC power disconnection. Similarly, the energy stored in the X-capacitor 2 passes through the fifth diode D5 of the bridge rectifier 111, the PFC inductor 113, the switch element S1 and the sixth diode D6 of the bridge rectifier 111, and flows back to the X-capacitor 2 to form a loop to discharge the X-capacitor 2.

Figure 17:
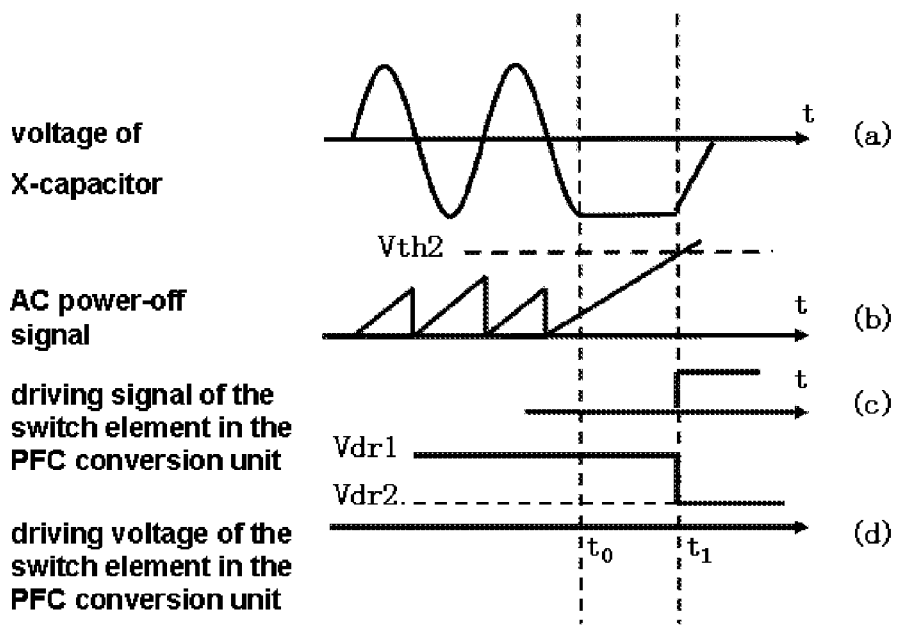
FIG. 17 shows waveforms of an embodiment of the present invention in which the X-capacitor is discharged by a power converter including a PFC conversion unit

Refer to FIG. 17, it shows the voltage waveforms of the embodiment of the present invention in which the X-capacitor is discharged by a power converter including a PFC conversion unit. FIG. 17($a$) shows the voltage of the X-capacitor, FIG. 17($b$) shows the AC power-off signal, FIG. 17($c$) shows the driving signal of the switch element in the PFC conversion unit, and FIG. 17($d$) shows the driving voltage of the switch element in the PFC conversion unit. As shown in the figure, when AC power is introduced, with voltage of the X-capacitor fluctuating as the input AC voltage, the AC power-off signal remains below the given second threshold voltage Vth2, and the switch element of the PFC conversion unit performs the switching motion on the basis of the load and the control mode, with the driving voltage of the PFC conversion being set as Vdr1. At this time, the PFC conversion unit works normally. At time t0, AC power is disconnected, the voltage of the X-capacitor remains at an instantaneous value. The voltage of the AC power-off signal increases continuously, reaches and exceeds the given second threshold voltage Vth2 in the end. That is to say, at time t1, disconnection of AC power is detected, the control unit controls the switch driving signal of the PFC conversion unit to be continuously in high level. The AC power-off signal affects the control unit to make the driving voltage of the PFC conversion unit dropped down to a lower value Vdr2. Thus, the switch element of the PFC conversion unit works in the saturation region, and the energy stored in the X-capacitor is released by the saturation switch.

Figure 18:
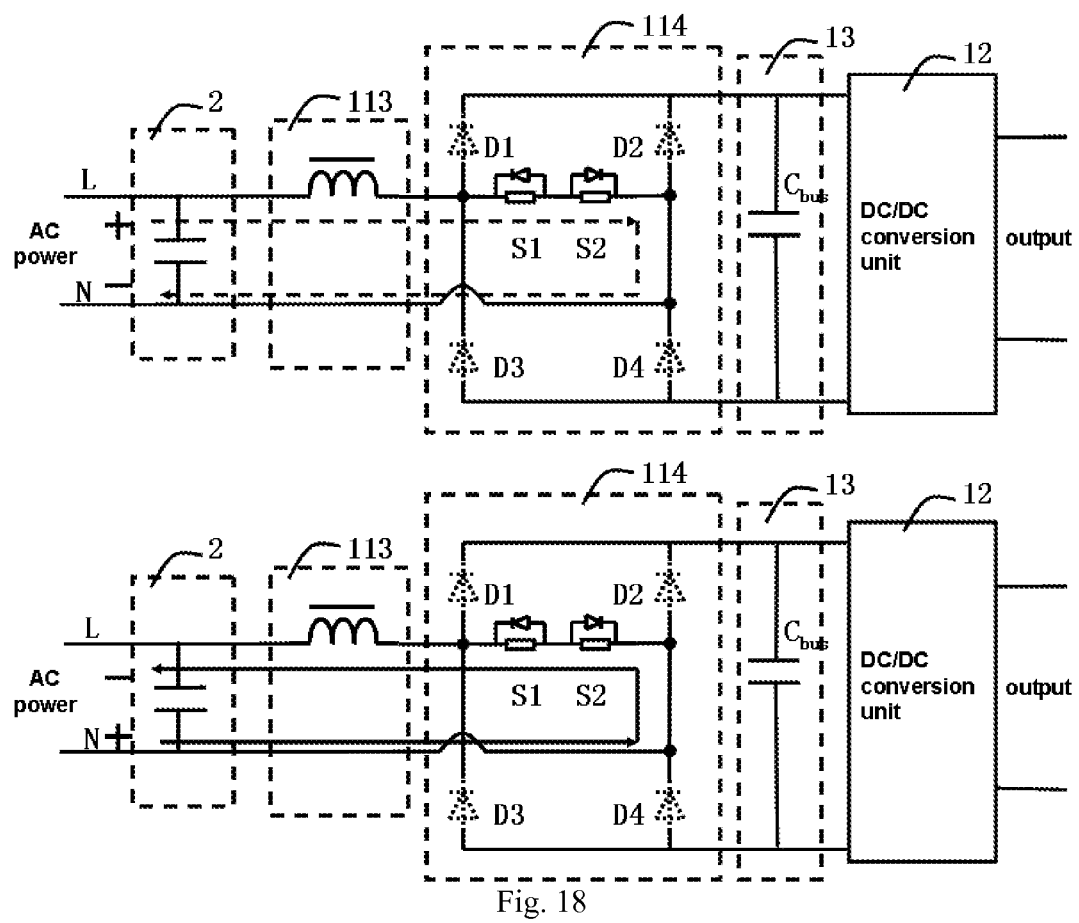
FIG. 18 shows a circuit schematic diagram of the discharge circuit of the X-capacitor in the power converter which includes a bridgeless PFC conversion unit in an embodiment of the present invention

Refer to FIG. 18, it shows a schematic diagram of the X-capacitor discharge circuit of the power converter including the bridgeless PFC conversion unit in an embodiment of the present invention. The conversion module in this embodiment is still two-stage, wherein the PFC conversion unit is a bridgeless PFC conversion unit. For the bridgeless PFC conversion unit, the PFC inductor is the one shown as (A) of FIG. 5, the switch diode network is the one shown as (A) of FIG. 6, and the H bridge PFC circuit of the bridgeless PFC conversion unit is formed. Likewise, when the disconnection of AC power is detected, the AC power-off signal outputted from the AC power-off detecting unit affects the control unit, which controls switch elements S1 and S2 of the bridgeless PFC conversion unit to work in the saturation region. The switch elements are equivalent to a resistor with large resistance, acting as the energy consumption unit. FIG. 18(A) is a schematic diagram of discharge circuit of the X-capacitor 2 in the case that the voltage of L line is positive at the time of AC power disconnection. The energy stored in the X-capacitor 2 passes through the PFC inductor 113 of the PFC conversion unit 11, the switch element S1 and S2 in the switch network 114, and flows back to the X-capacitor 2 to form a loop to discharge the X-capacitor 2. FIG. 18 (B) is a discharge circuit of the X-capacitor 2 in the case that the voltage of N line is positive at the time of AC power disconnection. Similarly, energy stored in the X-capacitor 2 passes through the PFC inductor 113 of the PFC conversion unit, the switch element S1 and S2 in the switch network 114, and flows back to the X-capacitor 2 to form a loop to discharge the X-capacitor 2.

Figure 19:
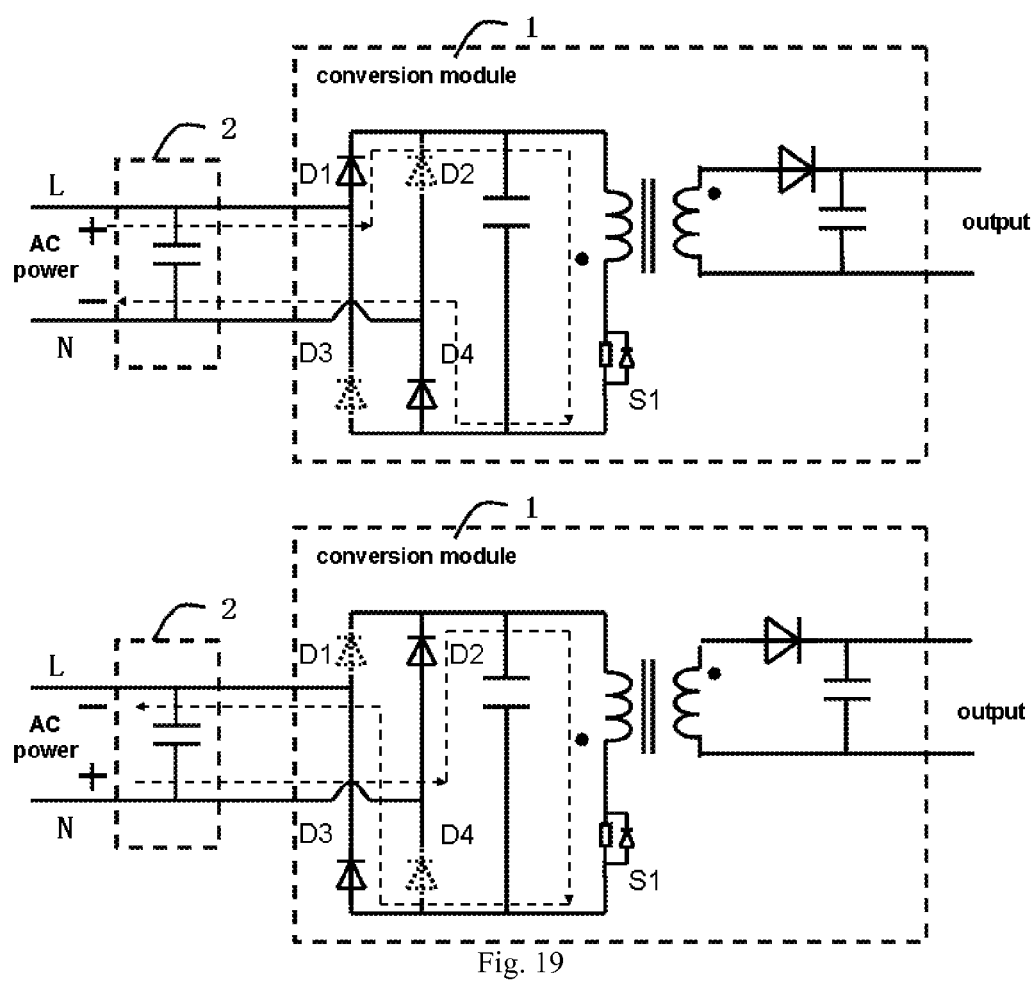
FIG. 19 shows circuit schematic diagram of the discharge circuit of the X-capacitor in the power converter which includes a single-stage conversion unit in an embodiment of the present invention.

Refer to FIG. 19, it is a schematic diagram of the X-capacitor discharge circuit of the power converter including the single-stage conversion unit in an embodiment of the present invention. The conversion module1 in this embodiment is a power converter consisted of a single-stage flyback conversion unit. Similarly, when the disconnection of AC power is detected, the AC power-off signal outputted from the AC power-off detecting unit 4 affects the control unit 5, which controls switch elements S1 of the single-stage conversion unit to work in the saturation region. The switch element is equivalent to a resistor with large resistance, acting as the energy consumption unit 6. FIG. 19(A) is a schematic diagram of the X-capacitor discharge circuit in the case that the voltage of L line is positive at the time of AC power disconnection. The energy stored in the X-capacitor 2 passes through a first diode D1, a flyback transformer, the switch element S1 and the fourth diode D4, and flows back to the X-capacitor to form a loop to discharge the X-capacitor 2. FIG. 19 (B) is a discharge circuit of the X-capacitor 2 in the case that the voltage of N line is positive at the time of AC power disconnection.

Similarly, the energy stored in the X-capacitor 2 passes through the second diode D2, the flyback transformer, the switch element S1 and the third diode D3, and flows back to the X-capacitor 2 to form a loop to discharge the X-capacitor 2.

In one embodiment of the present invention, the switch element in the PFC conversion unit or the single-stage conversion unit of the conversion module 1 is used as the energy consumption unit, and works in the saturation region to release the energy stored in the X-capacitor 2. Thus, the X-capacitor 2 is discharged, and the discharge current is restricted effectively. In other embodiments, other switch element in the conversion module 1 can be used as the switch element of the energy consumption unit 6 to release the energy stored in the X-capacitor 2. For example, an auxiliary conversion unit that comprises a switch element can be added to the conversion module 1. The switch element of the auxiliary conversion unit is off all the time when AC power is connected, and it operates in the saturation region when AC power is off to release the energy stored in the X-capacitor 2. In one embodiment, the control unit 5 is the one of the original conversion module 1, which controls the conversion module 1 to perform power conversion when AC power is introduced, and controls the switch element of the energy consumption unit 6 in the conversion module 1 to work in the saturation region to release the energy stored in the X-capacitor. In one embodiment, the control unit 5 stops working when AC power is introduced, and controls the switch element of the energy consumption unit 6 in the conversion module 1 to work in the saturation region to discharge the X-capacitor.

As stated previously, the characteristic of the present invention is that discharge of X-capacitor 2 is achieved by controlling the switch element of the energy consumption unit 6 in the conversion module 1 to work in the saturation region after the disconnection of AC power, not by a discharging resistor. Thus, when AC power is introduced normally, the power loss of the discharging resistor is eliminated, and when AC power is disconnected, the X-capacitor 2 is discharged by the energy consumption unit 6 of the conversion module 1, which meets the requirement of "safety of information technology equipment". The present invention has the power loss reduced with no energy consuming element added, and especially offers great help to enhance the efficiency of the bridgeless PFC conversion unit in the light-load mode.

What have been stated above are only preferred embodiments of the present invention, but the patent scope of the present invention is not limited to this. So, any equivalent structure variation based on the content of the description and figures of the present invention should fall within the scope of the present invention.

What is claimed is:

1. A capacitor discharging circuit, used to discharge a capacitor connected between AC power input terminals in a power converter, wherein the power converter also comprises a conversion module connected with the capacitor in parallel, the conversion module at least includes an energy consumption unit, and the capacitor discharging circuit comprises:

an AC power-off detecting unit connected to the AC power input terminals, and used to detect on-off state of AC power and generate an AC power-off signal;

a control unit connected to the output end of the AC power-off detecting unit, receiving the AC power-off signal outputted from the AC power-off detecting unit and controlling the operation of the energy consumption unit to consume the energy stored in the capacitor when disconnection of AC power is detected by the AC power-off detecting unit;

wherein the energy consumption unit comprises a switch element, when disconnection of AC power is detected by the AC power-off detecting unit, the control unit affected by the AC power-off signal outputs an enable signal turning on the switch element and decreases a driving voltage of the switch element, such that the switch element in the energy consumption unit works in a saturation region to consume the energy stored in the capacitor.

2. The capacitor discharging circuit according to claim 1, wherein the capacitor is an X-capacitor.

3. The capacitor discharging circuit according to claim 1, wherein the AC power-off detecting unit comprises:
a capacitor voltage regulation circuit, converting a received AC input signal and generating a voltage signal; and
a timing circuit, receiving the voltage signal generated by the capacitor voltage regulation circuit, measuring the time period of the positive voltage of AC power as well as that of the negative voltage respectively, if the time period of positive or that of negative voltage exceeds a given time, it is judged that AC power is disconnected.

4. The capacitor discharging circuit according to claim 1, wherein the control unit comprises:
a switching signal generation unit, used to receive the AC power-off signal outputted from the AC power-off detecting unit and to output the enable signal turning on the switch element; and
a driving unit, receiving the enable signal to the switch element outputted from the switching signal generation unit and the AC power-off signal outputted from the AC power-off detecting unit, and controlling the switch element in the energy consumption unit to work in the saturation region to consume the energy stored in the capacitor.

5. The capacitor discharging circuit according to claim 1, wherein the control unit comprises:
a switching signal generation unit used to output a signal controlling the switch element; and
a driving unit, receiving the AC power-off signal outputted from the AC power-off detecting unit to output the enable signal turning on the switch element, and controlling the switch element in the energy consumption unit to work in the saturation region to consume the energy stored in the capacitor.

6. The capacitor discharging circuit according to claim 1, wherein the control unit comprises:
a switching signal generation unit, used to receive the AC power-off signal outputted from the AC power-off detecting unit and output the enable signal turning on the switch element; and
a driving unit, receiving the enable signal to the switch element outputted from the switching signal generation unit, and controlling the switch element in the energy consumption unit to work in the saturation region to consume the energy stored in the capacitor.

7. The capacitor discharging circuit according to claim 1, wherein the conversion module includes a PFC conversion unit, being a bridge PFC conversion unit or a bridgeless PFC conversion unit, and also being a boost PFC conversion unit, a buck PFC conversion unit, or a boost-buck PFC conversion unit.

8. The capacitor discharging circuit according to claim 7, wherein the PFC conversion unit comprises at least one switch element, when AC power is disconnected, the switch element works in the saturation region, and the PFC conversion unit used as the energy consumption unit consumes the energy stored in the capacitor.

9. The capacitor discharging circuit according to claim 1, wherein the conversion module is a single-stage conversion module comprising at least a switch element, when AC power is disconnected, the switch element works in the saturation region and the single-stage conversion module used as the energy consumption unit consumes the energy stored in the capacitor.

10. A power converter, comprising:
a capacitor connected between AC power input terminals;
a conversion module, connected with the capacitor in parallel, comprising an energy consumption unit at least;
an AC power-off detecting unit connected with the AC power input terminals, and used to detect on-off state of AC power and generate an AC power-off signal;
a control unit, connected to the output end of the AC power-off detecting unit, receiving the AC power-off signal outputted from the AC power-off detecting unit, when disconnection of AC power is detected by the AC power-off detecting unit, the control unit affected by the AC power-off signal controls the operation of the energy consumption unit to consume the energy stored in the capacitor;
wherein the energy consumption unit comprises a switch element, when disconnection of AC power is detected by the AC power-off detecting unit, the control unit affected by the AC power-off signal outputs an enable signal turning on the switch element and decreases a driving voltage of the switch element, such that the switch element in the energy consumption unit works in a saturation region to consume the energy stored in the capacitor.

11. The power converter according to claim 10, wherein the AC power-off detecting unit comprises:
a capacitor voltage regulation circuit, converting the received AC input signal to generate a voltage signal; and
a timing circuit, receiving the voltage signal generated by the capacitor voltage regulation circuit, measuring the time period of positive and that of negative voltage of AC power respectively, if the time period of positive or negative voltage exceeds a given time, it is judged that AC power is disconnected.

12. The power converter according to claim 10, wherein the control unit comprises:
a switching signal generation unit, used to receive the AC power-off signal outputted from the AC power-off detecting unit and to output the enable signal turning on the switch element; and
a driving unit, receiving the enable signal turning on the switch element outputted from the switching signal generation unit and the AC power-off signal outputted from the AC power-off detecting unit, and controlling the switch element in the energy consumption unit to work in the saturation region to consume the energy stored in the capacitor.

13. The power converter according to claim 10, wherein the control unit comprises:
a switching signal generation unit used to output a signal controlling the switch element; and
a driving unit, receiving the AC power-off signal outputted from the AC power-off detecting unit to output the enable signal turning on the switch element, and controlling the switch element in the energy consumption unit to work in the saturation region to consume the energy stored in the capacitor.

14. The power converter according to claim 10, wherein the control unit comprises:

a switching signal generation unit, used to receive the AC power-off signal outputted from the AC power-off detecting unit and to output the enable signal turning on the switch element; and a driving unit, receiving the enable signal turning on the switch element outputted from the switching signal generation unit, and controlling the switch element in the energy consumption unit to work in the saturation region to consume the energy stored in the capacitor.

15. The power converter according to claim 10, wherein the conversion module includes a PFC conversion unit, being a bridge PFC conversion unit or a bridgeless PFC conversion unit, and also being a boost PFC conversion unit, a buck PFC conversion unit, or a boost-buck PFC conversion unit.

16. The power converter according to claim 15, wherein the PFC conversion unit comprises at least one switch element, when AC power is disconnected, the switch element works in the saturation region and the PFC conversion unit used as the energy consumption unit consumes the energy stored in the capacitor.

17. The power converter according to claim 10, wherein the conversion module is a single-stage conversion module comprising at least a switch element, when AC power is disconnected, the switch element works in the saturation region and the single-stage conversion module used as the energy consumption unit consumes the energy stored in the capacitor.

\* \* \* \* \*